(12) United States Patent
Sampsell

(10) Patent No.: US 7,880,954 B2
(45) Date of Patent: Feb. 1, 2011

(54) INTEGRATED MODULATOR ILLUMINATION

(75) Inventor: Jeffrey B. Sampsell, San Francisco, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 11/417,808

(22) Filed: May 3, 2006

(65) Prior Publication Data

US 2006/0198013 A1     Sep. 7, 2006

Related U.S. Application Data

(63) Continuation of application No. 10/794,825, filed on Mar. 5, 2004, now Pat. No. 7,706,050.

(51) Int. Cl.
*G02B 26/00* (2006.01)

(52) U.S. Cl. .................................. 359/292; 359/290

(58) Field of Classification Search .................. 359/290, 359/291, 292, 297, 298; 362/245, 231
See application file for complete search history.

(56) References Cited

U.S. PATENT DOCUMENTS

| | | |
|---|---|---|
| 2,534,846 A | 12/1950 | Ambrose et al. |
| 3,439,973 A | 4/1969 | Paul at al. |
| 3,443,854 A | 5/1969 | Weiss |
| 3,448,334 A | 6/1969 | Frost |
| 3,653,741 A | 4/1972 | Marks |
| 3,656,836 A | 4/1972 | de Cremoux et al. |
| 3,679,313 A | 7/1972 | Rosenberg |
| 3,725,868 A | 4/1973 | Malmer, Jr. et al. |
| 3,813,265 A | 5/1974 | Marks |
| 3,886,310 A | 5/1975 | Guldberg et al. |
| 3,924,929 A | 12/1975 | Holmen |
| 3,955,880 A | 5/1976 | Lierke |
| 4,099,854 A | 7/1978 | Decker et al. |
| 4,196,396 A | 4/1980 | Smith |
| 4,228,437 A | 10/1980 | Shelton |

(Continued)

FOREIGN PATENT DOCUMENTS

CN        1381752        11/2002

(Continued)

OTHER PUBLICATIONS

"Science and Technology", The Economist, May 22, 1999, pp. 89-90.

(Continued)

*Primary Examiner*—Ricky L Mack
*Assistant Examiner*—Brandi N Thomas
(74) *Attorney, Agent, or Firm*—Knobbe Martens Olson & Bear, LLP

(57) ABSTRACT

A spatial light modulator includes an array of elements to modulate light in accordance with image data. The modulator has a display panel having first and second surfaces arranged adjacent to the array of elements such that the second surface is directly adjacent the array of elements to allow a viewer to view an image produced by modulation of light The modulator may also include a light source to provide light to the display panel and illumination dots on the first surface of the display panel to reflect light from the source to the array of elements.

29 Claims, 4 Drawing Sheets

U.S. PATENT DOCUMENTS

| | | |
|---|---|---|
| 4,287,449 A | 9/1981 | Takeda et al. |
| 4,377,324 A | 3/1983 | Durand et al. |
| 4,389,096 A | 6/1983 | Hori et al. |
| 4,403,248 A | 9/1983 | te Velde |
| 4,421,381 A | 12/1983 | Ueda et al. |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,590,128 A | 5/1986 | Kawai |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,900,395 A | 2/1990 | Syverson et al. |
| 4,937,496 A | 6/1990 | Neiger et al. |
| 4,954,789 A | 9/1990 | Sampsell |
| 4,956,619 A | 9/1990 | Hornbeck |
| 4,974,942 A | 12/1990 | Gross |
| 4,982,184 A | 1/1991 | Kirkwood |
| 5,018,256 A | 5/1991 | Hornbeck |
| 5,022,745 A | 6/1991 | Zahowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,136,669 A | 8/1992 | Gerdt |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,164,858 A | 11/1992 | Aguilera, Jr. et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik et al. |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,291,314 A * | 3/1994 | Agranat et al. ................ 359/11 |
| 5,293,272 A | 3/1994 | Jannson et al. |
| 5,296,950 A | 3/1994 | Lin et al. |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,324,683 A | 6/1994 | Fitch et al. |
| 5,325,116 A | 6/1994 | Sampsell |
| 5,326,426 A | 7/1994 | Tam et al. |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,345,322 A | 9/1994 | Fergason |
| 5,345,328 A | 9/1994 | Fritz et al. |
| 5,358,601 A | 10/1994 | Cathey |
| 5,365,283 A | 11/1994 | Doherty et al. |
| 5,381,232 A | 1/1995 | van Wijk |
| 5,381,253 A | 1/1995 | Sharp et al. |
| 5,398,125 A | 3/1995 | Willett et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,474,865 A | 12/1995 | Vasudev |
| 5,481,385 A | 1/1996 | Zimmerman et al. |
| 5,489,952 A | 2/1996 | Gove et al. |
| 5,497,172 A | 3/1996 | Doherty et al. |
| 5,497,197 A | 3/1996 | Gove et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,521,797 A | 5/1996 | Kashima |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,550,373 A | 8/1996 | Cole et al. |
| 5,551,293 A | 9/1996 | Boysel et al. |
| 5,552,924 A | 9/1996 | Tregilgas |
| 5,552,925 A | 9/1996 | Worley |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,615,024 A | 3/1997 | May et al. |

| | | | | | | |
|---|---|---|---|---|---|---|
| 5,619,059 | A | 4/1997 | Li et al. | 6,295,154 B1 | 9/2001 | Laor et al. |
| 5,619,365 | A | 4/1997 | Rhoades et al. | 6,301,000 B1 | 10/2001 | Johnson |
| 5,619,366 | A | 4/1997 | Rhoads et al. | 6,323,982 B1 | 11/2001 | Hornbeck |
| 5,629,790 | A | 5/1997 | Neukermans et al. | 6,342,970 B1 | 1/2002 | Sperger et al. |
| 5,633,652 | A | 5/1997 | Kanbe et al. | 6,377,233 B2 | 4/2002 | Colgan et al. |
| 5,636,052 | A | 6/1997 | Arney et al. | 6,381,022 B1 | 4/2002 | Zavracky |
| 5,636,185 | A | 6/1997 | Brewer et al. | 6,407,785 B1 | 6/2002 | Yamazaki |
| 5,638,084 | A | 6/1997 | Kalt | 6,447,126 B1 | 9/2002 | Hornbeck |
| 5,638,946 | A | 6/1997 | Zavracky | 6,465,355 B1 | 10/2002 | Horsley |
| 5,641,391 | A | 6/1997 | Hunter et al. | 6,466,354 B1 | 10/2002 | Gudeman |
| 5,646,768 | A | 7/1997 | Kaeriyama | 6,466,358 B2 | 10/2002 | Tew |
| 5,650,881 | A | 7/1997 | Hornbeck | 6,473,274 B1 | 10/2002 | Maimone et al. |
| 5,654,741 | A | 8/1997 | Sampsell et al. | 6,480,177 B2 | 11/2002 | Doherty et al. |
| 5,657,099 | A | 8/1997 | Doherty et al. | 6,493,475 B1 | 12/2002 | Lin |
| 5,659,374 | A | 8/1997 | Gale, Jr. et al. | 6,496,122 B2 | 12/2002 | Sampsell |
| 5,665,997 | A | 9/1997 | Weaver et al. | 6,519,073 B1 | 2/2003 | Goossen |
| 5,671,994 | A | 9/1997 | Tai et al. | 6,538,813 B1 | 3/2003 | Magno et al. |
| 5,673,128 | A | 9/1997 | Ohta et al. | 6,545,335 B1 | 4/2003 | Chua et al. |
| 5,673,139 | A | 9/1997 | Johnson | 6,548,908 B2 | 4/2003 | Chua et al. |
| 5,683,591 | A | 11/1997 | Offenberg | 6,549,338 B1 | 4/2003 | Wolverton et al. |
| 5,703,710 | A | 12/1997 | Brinkman et al. | 6,552,840 B2 | 4/2003 | Knipe |
| 5,710,656 | A | 1/1998 | Goosen | 6,570,584 B1 | 5/2003 | Cok et al. |
| 5,712,694 | A | 1/1998 | Taira et al. | 6,574,033 B1 | 6/2003 | Chui et al. |
| 5,726,480 | A | 3/1998 | Pister | 6,589,625 B1 | 7/2003 | Kothari et al. |
| 5,739,945 | A | 4/1998 | Tayebati | 6,597,419 B1 | 7/2003 | Okada et al. |
| 5,745,193 | A | 4/1998 | Urbanus et al. | 6,597,490 B2 | 7/2003 | Tayebati |
| 5,745,281 | A | 4/1998 | Yi et al. | 6,600,201 B2 | 7/2003 | Hartwell et al. |
| 5,771,116 | A | 6/1998 | Miller et al. | 6,603,520 B2 | 8/2003 | Umemoto |
| 5,783,614 | A | 7/1998 | Chen | 6,606,175 B1 | 8/2003 | Sampsell et al. |
| 5,784,190 | A | 7/1998 | Worley | 6,625,047 B2 | 9/2003 | Coleman, Jr. |
| 5,784,212 | A | 7/1998 | Hornbeck | 6,630,786 B2 | 10/2003 | Cummings et al. |
| 5,793,504 | A | 8/1998 | Stoll | 6,631,998 B2 | 10/2003 | Egawa |
| 5,808,780 | A | 9/1998 | McDonald | 6,632,698 B2 | 10/2003 | Ives |
| 5,815,229 | A | 9/1998 | Shapiro | 6,642,913 B1 | 11/2003 | Kimura |
| 5,818,095 | A | 10/1998 | Sampsell | 6,643,067 B2 | 11/2003 | Miyamae |
| 5,825,528 | A | 10/1998 | Goosen | 6,643,069 B2 | 11/2003 | Dewald |
| 5,835,255 | A | 11/1998 | Miles | 6,650,455 B2 | 11/2003 | Miles |
| 5,842,088 | A | 11/1998 | Thompson | 6,652,109 B2 | 11/2003 | Nakamura |
| 5,883,684 | A | 3/1999 | Milikan et al. | 6,666,561 B1 | 12/2003 | Blakley |
| 5,912,758 | A | 6/1999 | Knipe et al. | 6,669,350 B2 | 12/2003 | Yamashita |
| 5,913,594 | A | 6/1999 | Iimura | 6,674,090 B1 | 1/2004 | Chua et al. |
| 5,914,804 | A | 6/1999 | Goosen | 6,674,562 B1 | 1/2004 | Miles |
| 5,920,417 | A | 7/1999 | Johnson | 6,680,792 B2 | 1/2004 | Miles |
| 5,933,183 | A | 8/1999 | Enomoto et al. | 6,683,693 B1 | 1/2004 | Tsuka et al. |
| 5,943,158 | A | 8/1999 | Ford et al. | 6,700,695 B2 | 3/2004 | Engler et al. |
| 5,959,763 | A | 9/1999 | Bozler et al. | 6,709,123 B2 | 3/2004 | Flohr |
| 5,986,796 | A | 11/1999 | Miles et al. | 6,710,908 B2 | 3/2004 | Miles et al. |
| 6,028,690 | A | 2/2000 | Carter et al. | 6,738,194 B1 | 5/2004 | Ramirez et al. |
| 6,031,653 | A | 2/2000 | Wang et al. | 6,741,377 B2 | 5/2004 | Miles |
| 6,038,056 | A | 3/2000 | Florence et al. | 6,741,384 B1 | 5/2004 | Martin et al. |
| 6,040,937 | A | 3/2000 | Miles | 6,741,503 B1 | 5/2004 | Farris et al. |
| 6,049,317 | A | 4/2000 | Thompson et al. | 6,742,907 B2 | 6/2004 | Funamoto et al. |
| 6,055,090 | A | 4/2000 | Miles | 6,747,785 B2 | 6/2004 | Chen et al. |
| 6,061,075 | A | 5/2000 | Nelson et al. | 6,747,800 B1 | 6/2004 | Lin |
| 6,088,102 | A | 7/2000 | Manhart | 6,775,174 B2 | 8/2004 | Huffman et al. |
| 6,099,132 | A | 8/2000 | Kaeriyama | 6,778,155 B2 | 8/2004 | Doherty et al. |
| 6,099,134 | A | 8/2000 | Taniguchi | 6,792,293 B1 | 9/2004 | Awan et al. |
| 6,100,872 | A | 8/2000 | Aratani et al. | 6,794,119 B2 | 9/2004 | Miles |
| 6,113,239 | A | 9/2000 | Sampsell et al. | 6,798,469 B2 | 9/2004 | Kimura |
| 6,147,790 | A | 11/2000 | Meier et al. | 6,811,267 B1 | 11/2004 | Allen et al. |
| 6,151,089 | A | 11/2000 | Yang et al. | 6,819,469 B1 | 11/2004 | Koba |
| 6,160,833 | A | 12/2000 | Floyd et al. | 6,822,628 B2 | 11/2004 | Dunphy et al. |
| 6,180,428 | B1 | 1/2001 | Peeters et al. | 6,822,780 B1 | 11/2004 | Long, Jr. |
| 6,195,196 | B1 | 2/2001 | Kimura et al. | 6,829,132 B2 | 12/2004 | Martin et al. |
| 6,199,989 | B1 | 3/2001 | Maeda et al. | 6,829,258 B1 * | 12/2004 | Carlisle et al. ............... 372/20 |
| 6,201,633 | B1 | 3/2001 | Peeters et al. | 6,844,953 B2 | 1/2005 | Reboa |
| 6,232,936 | B1 | 5/2001 | Gove et al. | 6,853,129 B1 | 2/2005 | Cummings et al. |
| 6,243,149 | B1 | 6/2001 | Swanson et al. | 6,853,418 B2 | 2/2005 | Suzuki et al. |
| 6,273,577 | B1 | 8/2001 | Goto | 6,855,610 B2 | 2/2005 | Tung et al. |
| 6,282,010 | B1 | 8/2001 | Sulzbach et al. | 6,859,218 B1 | 2/2005 | Luman et al. |
| 6,285,424 | B1 | 9/2001 | Yoshida | 6,861,277 B1 | 3/2005 | Monroe et al. |
| 6,288,824 | B1 | 9/2001 | Kastalsky | 6,862,022 B2 | 3/2005 | Slupe |
| 6,292,504 | B1 * | 9/2001 | Halmos ................ 372/97 | 6,862,029 B1 | 3/2005 | D'Souza et al. |

| | | |
|---|---|---|
| 6,864,882 B2 | 3/2005 | Newton |
| 6,865,312 B2 | 3/2005 | Niv et al. |
| 6,867,896 B2 | 3/2005 | Miles |
| 6,870,581 B2 | 3/2005 | Li et al. |
| 6,870,654 B2 | 3/2005 | Lin et al. |
| 6,871,982 B2 | 3/2005 | Holman et al. |
| 6,879,354 B1 | 4/2005 | Sawayama |
| 6,880,959 B2 | 4/2005 | Houston |
| 6,882,458 B2 | 4/2005 | Lin et al. |
| 6,882,461 B1 | 4/2005 | Tsai et al. |
| 6,897,855 B1 | 5/2005 | Matthies |
| 6,912,022 B2 | 6/2005 | Lin et al. |
| 6,930,816 B2 | 8/2005 | Mochizuki |
| 6,951,401 B2 | 10/2005 | Van Hees et al. |
| 6,952,303 B2 | 10/2005 | Lin et al. |
| 6,958,847 B2 | 10/2005 | Lin |
| 6,999,236 B2 | 2/2006 | Lin et al. |
| 7,002,726 B2 | 2/2006 | Patel et al. |
| 7,009,754 B2 | 3/2006 | Huibers |
| 7,042,444 B2 | 5/2006 | Cok |
| 7,042,643 B2 | 5/2006 | Miles |
| 7,050,219 B2 | 5/2006 | Kimura |
| 7,072,093 B2 | 7/2006 | Piehl et al. |
| 7,072,096 B2 | 7/2006 | Holman et al. |
| 7,110,158 B2 | 9/2006 | Miles |
| 7,123,216 B1 | 10/2006 | Miles |
| 7,133,022 B2 | 11/2006 | Grabert |
| 7,187,489 B2 | 3/2007 | Miles |
| 7,236,663 B2 | 6/2007 | Wakita et al. |
| 7,262,754 B1 | 8/2007 | Yamazaki |
| 7,349,139 B2 | 3/2008 | Chui |
| 7,349,141 B2 | 3/2008 | Tung |
| 7,352,501 B2 | 4/2008 | Chopra et al. |
| 7,355,780 B2 | 4/2008 | Chui |
| 7,389,476 B2 | 6/2008 | Senda et al. |
| 7,417,784 B2 | 8/2008 | Sasagawa |
| 7,450,295 B2 | 11/2008 | Tung |
| 7,520,642 B2 | 4/2009 | Holman et al. |
| 7,561,323 B2 | 7/2009 | Gally |
| 7,603,001 B2 | 10/2009 | Wang |
| 7,706,050 B2 | 4/2010 | Sampsell |
| 7,719,747 B2 | 5/2010 | Tung |
| 7,750,886 B2 | 7/2010 | Sampsell |
| 7,766,498 B2 | 8/2010 | Sampsell |
| 2001/0003487 A1 | 6/2001 | Miles |
| 2001/0010630 A1 | 8/2001 | Umemoto |
| 2001/0019479 A1 | 9/2001 | Nakabayashi et al. |
| 2001/0022636 A1 | 9/2001 | Yang et al. |
| 2001/0049061 A1 | 12/2001 | Nakagaki et al. |
| 2001/0055208 A1 | 12/2001 | Kimura |
| 2002/0006036 A1 | 1/2002 | Egawa |
| 2002/0015215 A1 | 2/2002 | Miles |
| 2002/0024711 A1 | 2/2002 | Miles |
| 2002/0044445 A1 | 4/2002 | Bohler |
| 2002/0054424 A1 | 5/2002 | Miles |
| 2002/0075555 A1 | 6/2002 | Miles |
| 2002/0105699 A1 | 8/2002 | Miracky et al. |
| 2002/0106182 A1 | 8/2002 | Kawashima |
| 2002/0126364 A1 | 9/2002 | Miles |
| 2002/0131151 A1 | 9/2002 | Engler et al. |
| 2002/0149584 A1 | 10/2002 | Simpson |
| 2002/0167730 A1 | 11/2002 | Needham et al. |
| 2002/0191130 A1 | 12/2002 | Liang et al. |
| 2003/0011864 A1 | 1/2003 | Flanders |
| 2003/0012009 A1 | 1/2003 | Suzuki |
| 2003/0016930 A1 | 1/2003 | Inditsky |
| 2003/0043157 A1 * | 3/2003 | Miles .................. 345/540 |
| 2003/0072070 A1 | 4/2003 | Miles |
| 2003/0083429 A1 | 5/2003 | Smith |
| 2003/0086031 A1 | 5/2003 | Taniguchi |
| 2003/0090887 A1 | 5/2003 | Igarashi |
| 2003/0095401 A1 | 5/2003 | Hanson |
| 2003/0098957 A1 | 5/2003 | Haldiman |
| 2003/0103344 A1 | 6/2003 | Niida |
| 2003/0151821 A1 | 8/2003 | Favalora et al. |
| 2003/0160913 A1 | 8/2003 | Yamashita |
| 2003/0160919 A1 | 8/2003 | Suzuki et al. |
| 2003/0165067 A1 | 9/2003 | Imamura |
| 2003/0169385 A1 | 9/2003 | Okuwaki |
| 2003/0179383 A1 | 9/2003 | Chen et al. |
| 2003/0193630 A1 | 10/2003 | Chiou |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2003/0206281 A1 | 11/2003 | Jain |
| 2003/0210222 A1 * | 11/2003 | Ogiwara et al. ............. 345/103 |
| 2003/0210367 A1 | 11/2003 | Nakano |
| 2004/0001169 A1 | 1/2004 | Saiki |
| 2004/0017599 A1 | 1/2004 | Yang |
| 2004/0027315 A1 | 2/2004 | Senda et al. |
| 2004/0051929 A1 | 3/2004 | Sampsell et al. |
| 2004/0058532 A1 | 3/2004 | Miles et al. |
| 2004/0061946 A1 | 4/2004 | Yoshikawa |
| 2004/0070711 A1 | 4/2004 | Wen et al. |
| 2004/0080807 A1 | 4/2004 | Chen et al. |
| 2004/0080938 A1 * | 4/2004 | Holman et al. ............. 362/231 |
| 2004/0085748 A1 | 5/2004 | Sugiura |
| 2004/0100796 A1 | 5/2004 | Ward |
| 2004/0115339 A1 | 6/2004 | Ito |
| 2004/0125048 A1 | 7/2004 | Fukuda et al. |
| 2004/0145049 A1 | 7/2004 | McKinnell et al. |
| 2004/0147056 A1 | 7/2004 | McKinnell et al. |
| 2004/0147198 A1 | 7/2004 | Lin et al. |
| 2004/0160143 A1 | 8/2004 | Shreeve et al. |
| 2004/0170373 A1 | 9/2004 | Kim |
| 2004/0174583 A1 | 9/2004 | Chen et al. |
| 2004/0175577 A1 | 9/2004 | Lin et al. |
| 2004/0179281 A1 | 9/2004 | Reboa |
| 2004/0184134 A1 | 9/2004 | Makigaki |
| 2004/0207897 A1 | 10/2004 | Lin |
| 2004/0209192 A1 | 10/2004 | Lin et al. |
| 2004/0209195 A1 | 10/2004 | Lin |
| 2004/0212026 A1 | 10/2004 | Van Brocklin et al. |
| 2004/0217378 A1 | 11/2004 | Martin et al. |
| 2004/0217919 A1 | 11/2004 | Pichl et al. |
| 2004/0218251 A1 | 11/2004 | Piehl et al. |
| 2004/0218334 A1 | 11/2004 | Martin et al. |
| 2004/0218341 A1 | 11/2004 | Martin et al. |
| 2004/0218390 A1 | 11/2004 | Holman et al. |
| 2004/0227493 A1 | 11/2004 | Van Brocklin et al. |
| 2004/0240032 A1 | 12/2004 | Miles |
| 2004/0240138 A1 | 12/2004 | Martin et al. |
| 2004/0245588 A1 | 12/2004 | Nikkel et al. |
| 2004/0263944 A1 | 12/2004 | Miles et al. |
| 2005/0001828 A1 | 1/2005 | Martin et al. |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0036192 A1 | 2/2005 | Lin et al. |
| 2005/0038950 A1 | 2/2005 | Adelmann |
| 2005/0041175 A1 | 2/2005 | Akiyama |
| 2005/0042117 A1 | 2/2005 | Lin |
| 2005/0046922 A1 | 3/2005 | Lin et al. |
| 2005/0046948 A1 | 3/2005 | Lin |
| 2005/0057442 A1 | 3/2005 | Way |
| 2005/0068583 A1 | 3/2005 | Gutkowski et al. |
| 2005/0068605 A1 | 3/2005 | Tsai |
| 2005/0068606 A1 | 3/2005 | Tsai |
| 2005/0069209 A1 | 3/2005 | Damera-Venkata et al. |
| 2005/0069254 A1 | 3/2005 | Schultheis |
| 2005/0078348 A1 | 4/2005 | Lin |
| 2005/0120553 A1 | 6/2005 | Brown |
| 2005/0146897 A1 | 7/2005 | Mimura |
| 2005/0168849 A1 | 8/2005 | Lin |

| | | | | | | |
|---|---|---|---|---|---|---|
| 2005/0179977 A1* | 8/2005 | Chui et al. ............ 359/237 | EP | 1 698 918 | | 9/2006 |
| 2005/0195175 A1 | 9/2005 | Anderson | GB | 2278222 | A | 11/1994 |
| 2005/0195370 A1 | 9/2005 | Gore | GB | 2 315 356 | | 1/1998 |
| 2005/0195462 A1 | 9/2005 | Lin | GB | 2321532 | A | 7/1998 |
| 2005/0195468 A1 | 9/2005 | Sampsell | GB | 2 336 933 | | 3/1999 |
| 2005/0231977 A1 | 10/2005 | Hayakawa | GB | 2 351 834 | | 1/2001 |
| 2005/0231981 A1 | 10/2005 | Hoelen et al. | JP | 60 165621 | A | 8/1985 |
| 2005/0286113 A1 | 12/2005 | Miles | JP | 60 242408 | | 12/1985 |
| 2006/0001942 A1 | 1/2006 | Chui | JP | 405275401 | A | 10/1993 |
| 2006/0002141 A1 | 1/2006 | Ouderkirk et al. | JP | 06-265870 | A | 9/1994 |
| 2006/0024017 A1 | 2/2006 | Page | JP | 08 018990 | | 1/1996 |
| 2006/0044523 A1 | 3/2006 | Teijido | JP | 08018990 | A | 1/1996 |
| 2006/0050032 A1 | 3/2006 | Gunner | JP | 08 050283 | A | 2/1996 |
| 2006/0066541 A1 | 3/2006 | Gally | JP | 09 160032 | | 6/1997 |
| 2006/0066586 A1 | 3/2006 | Gally | JP | 09 281917 | | 10/1997 |
| 2006/0066783 A1 | 3/2006 | Sampsell | JP | 09281917 | A | 10/1997 |
| 2006/0066935 A1 | 3/2006 | Cummings et al. | JP | 09 311333 | | 12/1997 |
| 2006/0067651 A1 | 3/2006 | Chui | JP | 10 500224 | | 1/1998 |
| 2006/0077154 A1 | 4/2006 | Gally et al. | JP | 10-096910 | | 4/1998 |
| 2006/0077509 A1 | 4/2006 | Tung et al. | JP | 10 325953 | | 12/1998 |
| 2006/0077510 A1 | 4/2006 | Chui et al. | JP | 11 174234 | | 7/1999 |
| 2006/0132383 A1 | 6/2006 | Gally et al. | JP | 11174234 | A | 7/1999 |
| 2006/0209012 A1 | 9/2006 | Hagood | JP | 11 211999 | | 8/1999 |
| 2006/0209384 A1 | 9/2006 | Chui et al. | JP | 11 249132 | | 9/1999 |
| 2006/0209385 A1 | 9/2006 | Liu et al. | JP | 2000-075287 | | 3/2000 |
| 2006/0265919 A1 | 11/2006 | Huang | JP | 2000 075293 | | 3/2000 |
| 2007/0187852 A1 | 8/2007 | Parker et al. | JP | 2000 081848 | | 3/2000 |
| 2007/0196040 A1 | 8/2007 | Wang et al. | JP | 2000 181367 | | 6/2000 |
| 2007/0201234 A1 | 8/2007 | Ottermann | JP | 2000 193933 | | 7/2000 |
| 2007/0297191 A1 | 12/2007 | Sampsell | JP | 2000 193933 | | 11/2000 |
| 2008/0100900 A1 | 5/2008 | Chui | JP | 2001-021883 | | 1/2001 |
| 2009/0147535 A1 | 6/2009 | Mienko | JP | 2001 021883 | | 1/2001 |
| 2009/0168459 A1 | 7/2009 | Holman | JP | 2001305312 | | 10/2001 |
| 2009/0225394 A1 | 9/2009 | Chui | JP | 2001 343514 | | 12/2001 |
| 2009/0296194 A1 | 12/2009 | Gally | JP | 2001/343514 | A | 12/2001 |
| 2009/0310208 A1 | 12/2009 | Wang | JP | 2002 108227 | | 4/2002 |
| 2009/0323153 A1 | 12/2009 | Sampsell | JP | 2002-108227 | | 4/2002 |
| 2010/0182308 A1 | 7/2010 | Holman | JP | 2002 523798 | | 7/2002 |
| | | | JP | 2002-229023 | | 8/2002 |
| | FOREIGN PATENT DOCUMENTS | | JP | 2002 245835 | | 8/2002 |
| | | | JP | 2002-245835 | | 12/2002 |
| DE | 199 42 513 | 3/2001 | JP | 2003 131215 | | 5/2003 |
| DE | 102 28 946 | 1/2004 | JP | 2003131215 | | 5/2003 |
| DE | 10228946 | 1/2004 | JP | 2003 173713 | | 6/2003 |
| EP | 0 278 038 | 8/1988 | JP | 2003 188959 | | 7/2003 |
| EP | 0 366 117 | 5/1990 | JP | 2003 195201 | | 7/2003 |
| EP | 0366117 A2 | 5/1990 | JP | 2003188959 | | 7/2003 |
| EP | 0389031 A1 | 9/1990 | JP | 2003-315694 | | 11/2003 |
| EP | 0590511 | 4/1994 | JP | 2003 344881 | | 12/2003 |
| EP | 0667548 A1 | 8/1995 | JP | 2004-219843 A | | 8/2004 |
| EP | 0786911 A2 | 7/1997 | KR | 2002 010322 | | 2/2002 |
| EP | 0822441 A2 | 2/1998 | KR | 2002/010322 A | | 2/2002 |
| EP | 0830032 A2 | 3/1998 | TW | 567388 | | 12/2003 |
| EP | 0 855 745 A2 | 7/1998 | WO | WO 95/01584 | | 1/1995 |
| EP | 0855745 | 7/1998 | WO | WO 95/14256 A1 | | 5/1995 |
| EP | 0 867 747 A2 | 9/1998 | WO | WO 95/30924 | | 11/1995 |
| EP | 0 879 991 | 11/1998 | WO | WO 97/17628 | | 5/1997 |
| EP | 0 907 050 | 4/1999 | WO | WO 98/19201 | | 5/1998 |
| EP | 0 984 314 | 3/2000 | WO | WO 99/52006 A2 | | 10/1999 |
| EP | 1 014 161 A1 | 6/2000 | WO | WO 99/52006 A3 | | 10/1999 |
| EP | 1 089 115 A1 | 4/2001 | WO | WO 99/63394 | | 12/1999 |
| EP | 1 127 984 | 8/2001 | WO | WO 00/11502 | | 3/2000 |
| EP | 1251454 | 4/2002 | WO | WO 01/57434 | | 8/2001 |
| EP | 1271223 A2 | 6/2002 | WO | WO 01/84228 | | 11/2001 |
| EP | 1 306 609 | 5/2003 | WO | WO 01/84229 | | 11/2001 |
| EP | 1341025 A1 | 9/2003 | WO | WO 02/24570 A1 | | 3/2002 |
| EP | 1389775 A2 | 2/2004 | WO | WO 02/71132 A2 | | 9/2002 |
| EP | 1413543 A1 | 4/2004 | WO | WO 02/097324 | | 12/2002 |
| EP | 1450418 A2 | 8/2004 | WO | WO 03/007049 A1 | | 1/2003 |
| EP | 1519218 A1 | 3/2005 | WO | WO 03/056876 A2 | | 7/2003 |
| EP | 1 531 302 | 5/2005 | WO | WO 03/069413 A1 | | 8/2003 |
| EP | 1 577 701 | 9/2005 | WO | WO 03/073151 A1 | | 9/2003 |
| EP | 1 640 776 | 3/2006 | WO | WO 03/075207 | | 9/2003 |

| | | |
|---|---|---|
| WO | WO 03/105198 A1 | 12/2003 |
| WO | WO 2004/003643 | 1/2004 |
| WO | WO 2004/006003 A1 | 1/2004 |
| WO | WO 2004/026757 A2 | 4/2004 |
| WO | WO 2004/027514 | 4/2004 |
| WO | WO 2004/027514 A2 | 4/2004 |
| WO | WO 2004/036270 A1 | 4/2004 |
| WO | WO 2004/068460 | 8/2004 |
| WO | WO 2004/088372 | 10/2004 |
| WO | WO 2005/011012 | 2/2005 |
| WO | WO 2005/093490 | 10/2005 |
| WO | WO 2006/008702 | 1/2006 |
| WO | WO 2006/036451 | 4/2006 |
| WO | WO 2006/036496 | 4/2006 |
| WO | WO 2008/069877 | 6/2008 |

OTHER PUBLICATIONS

Akasaka, "Three-Dimensional IC Trends", Proceedings of IEEE, vol. 74, No. 12, pp. 1703-1714, (Dec. 1986).
Aratani et al.; "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).
Aratani K., et al., "Surface micromachined tuneable interferometer array," Sensors and Actuators, pp. 17-23. (1994).
Conner, "Hybrid Color Display Using Optical Interference Filter Array," SID Digest, pp. 577-580 (1993).
Fan et al., "Channel Drop Filters in Photonic Crystals", Optics Express, vol. 3, No. 1, 1998.
Giles et al., "Silicon MEMS Optical Switch Attenuator and Its Use in Lightwave Subsystems", IEEE Journal of Selected Topics in Quanum Electronics, vol. 5. No. 1, Jan./Feb. 1999,pp. 18-25.
XP 000657155, May 23, 1995, Tai.
Goossen et al., "Possible Display Applications of the Silicon Mechanical Anti-Reflection Switch," Society for Information Display (1994).
Goossen et al., "Silicon Modulator Based on Mechanically-Active Anti-Reflection Layer with 1Mbit/sec Capability for Fiber-in-the-Loop Applications," IEEE Photonics Technology Letters, pp. 1119, 1121 (Sep. 1994).
Goossen, "MEMS-Based Variable Optical Interference Devices", 2000 IEEE/LEOS International Conference on Optical MEMS, pp. 17 and 18, (Aug. 21-24, 2000).
Gosch, "West Germany Grabs the Lead in X-Ray Lithography," Electronics pp. 78-80 (Feb. 5, 1987).
Hohlfeld et al., "Micro-Machined Tunable Optical Filters With Optimized Band-Pass Spectrum", 12th International Conference on Transducers, Solid-State Sensors, Actuators and Microsystems, vol. 2, pp. 1494-1497, (Jun. 8-12, 2003).
Howard et al., "Nanometer-Scale Fabrication Techniques", VLSI Electronics: Microstructure Science, vol. 5, pp. 145-153 and pp. 166-173 (1982).
Huang, et al., "Multidirectional Asymmetrical Microlens-Array Light Control Films for High Performance Reflective Liquid Crystal Displays", SID Digest, 2002, pp. 870-873.
Ibbotson, et al. "Comparison of XeF2 and F-atom Reactions with Si and SiO2," Applied Physics Letters. vol. 44, No. 12, Jun. 1984. pp. 1129-1131.
Jackson "Classical Electrodynamics", John Wiley & Sons Inc., pp. 568-573. (date unknown).
Jerman et al., "A Miniature Fabry-Perot Interferometer Fabricated Using Silicon Micromaching Techniques," IEEE Electron Devices Society (1998).
Jerman et al., "A Miniature Fabry-Perot Interferometer with a Corrugated Silicon Diaphragm Support", (1988).
Joannopulos et al., Photonic Crystals, "Molding the Flow of Light", Copyright 1995.
Johnson "Optical Scanners", Microwave Scanning Antennas, vol. 1, p. 251-261, (1964).
Kim et al., "Control of Optical Transmission Through metals Perforated With Subwavelength Hole Arrays", Optic Letters, vol. 24, No. 4,Feb. 15, 1999, pp. 256-257.
Light over Matter, Circle No. 36 (Jun. 1993).
Lin et al., "Free-Space Micromachined Optical Switches for Optical Networking", IEEE Journal of Selected Topics in Quantum Electronics, vol. 5, No. 1, Jan./Feb. 1999, pp. 4-9.
Little et al., "Vertically Coupled Glass Microring Rosonator Channel Dropping Filter", IEEE Photonics Technology Letters, vol. 11, No. 2, 1999.
Magel, "Integrated Optic Devices Using Micromachined Metal Membranes", SPIE vol. 2686, 0-8194-2060-3/1996.
Manzardo et al., "Optics and Actuators for Miniaturized Spectrometers," International Conference on Optical MEMS, 12(6):23-24 (Dec. 2003).
Mehregany et al., "MEMS Applications in Optical Systems", IEEE/LEOS 1996 Summer Topical Meetings, pp. 75-76, (Aug. 5-9, 1996).
Miles, et al., Digital Paper for reflective displays, Journal of the Society for Information Display, San Jose, CA, vol. 11, No. 1, 2003, pp. 209-215.
Miles, Interferometric Modulation: MOEMS as an enabling technology for high-performance reflective displays, Proceedings of the SPIE, 4985:28, pp. 131-139, Jan. 2003.
Miles, Mark, W., "A New Reflective FPD Technology Using Interferometric Modulation", The Proceedings of the Society for Information Display (May 11-16, 1997).
Miles, MW "A MEMS Based Interferometric Modulator (IMOD) for Display Applications" Proceedings of Sensors Expo, Oct. 21, 1997 © 1997 Helmer's Publishing, Inc. (Oct. 21, 1997), pp. 281-284 XP009058455.
Nagami et al., "Plastic Cell Architecture: Towards Reconfigurable Computing for General-Purpose", IEEE, 0-8186-8900-5/98, pp. 68-77.
Newsbreaks, "Quantum-trench devices might operate at terahertz frequencies", Laser Focus World (May 1993).
Obi et al., "Fabrication of Optical MEMS in SOL-GEL Materials", 2002 IEEE/LEOS International Conference on Optical MEMS, Conference Digest, pp. 39 and 40,(Aug. 20-23, 2002).
Oliner, "Radiating Elements and Mutual Coupling," Microwave Scanning Antennas, vol. 2, 131-157 and pp. 190-194 (1966).
Raley et al., "A Fabry-Perot Microinterferometer for Visible Wavelengths," IEEE Solid-State Sensor and Actuator Workshop, Hilton Head, SC, pp. 170-173 (1992).
Schnakenberg, et al. "Tmahw Etchants for Silicon Micromachining". 1991 International Conference on Solid State Sensors and 'Actuators—Digest of Technical Papers. pp. 815-818.
Sperger et al., "High Performance Patterned All-Dielectric Interference Colour Filter for Display Applications", SID Digest, pp. 81-83, (1994).
Stone, "Radiation and Optics, An Introduction to the Classical Theory", McGraw-Hill, pp. 340-343, (1963).
Tai, C.Y. et al., "A Transparent Front Lighting System for Reflective-type Displays," 1995 SID International Symposium Digest of Technical Papers, Orlando, May 23-25, 1995, SID International Symposium Digest of Technical Papers, Santa Ana, SID, US vol. 26, May 23, 1995. pp. 375-378, XP000657155.
Walker, et al., "Electron-beam-tunable Interference Filter Spatial Light Modulator", Optics Letters vol. 13, No. 5, pp. 345-347, (May 1988).
Williams, et al. "Etch Rates for Micromachining Processing", Journal of Microelectromechanical Systems. vol. 5 No. 4, Dec. 1996, pp. 256-269.
Winters, et al., "The Etching of Silicon with XeF2 Vapor". Applied Physics Letters, vol. 34. No. 1, Jan. 1979, pp. 70-73.
Winton, John M., "A novel way to capture solar energy", Chemical Week, (May 1985).
Wu, "Design of a Reflective Color LCD Using Optical Interference Reflectors", ASIA Display '95, pp. 929-931, (Oct. 1995).
Zhou et al., "Waveguide Panel Display Using Electromechanical Spatial Modulators" SID Digest, vol. XXIX, 1998.
Official Communication for European App. No. 05724222.4 dated Jun. 19, 2007.
ISR and WO for PCT Application No. PCT/US2005/006629, Dated O 6, 2005.
IPRP for PCT/US05/006629 filed Feb. 28, 2005.
Office Action mailed Aug. 1, 2007 in U.S. Appl. No. 10/794,825.

Office Action mailed Feb. 15, 2007 in U.S. Appl. No. 10/794,825.
Amendment and Response to Office Action mailed Feb. 15, 2007 in U.S. Appl. No. 10/794,825.
Office Action mailed Jul. 5, 2006 in U.S. Appl. No. 10/794,825.
Amendment and Response to Office Action mailed Jul. 5, 2006 in U.S. Appl. No. 10/794,825.
Notice of Allowance mailed Jan. 13, 2006 in U.S. Appl. No. 10/794,825.
Amendment Filed with Request for Continued Examination on Apr. 11, 2006 in U.S. Appl. No. 10/794,825.
Request for Restriction/Election mailed Sep. 2, 2005 in U.S. Appl. No. 10/794,825.
Response to Request for Restriction/Election mailed Sep. 2, 2005 in U.S. Appl. No. 10/794,825.
Office Action mailed Mar. 11, 2005 in U.S. Appl. No. 10/794,825.
Response to Office Action mailed Mar. 11, 2005 in U.S. Appl. No. 10/794,825.
Office Action mailed Jun. 17, 2004 in U.S. Appl. No. 10/794,825.
Amendment and Response to Office Action mailed Jun. 17, 2004 in U.S. Appl. No. 10/794,825.
Notice of Allowance mailed Apr. 6, 2006 in U.S. Appl. No. 11/057,392.
Request for Continued Examination mailed Jul. 5, 2006 in U.S. Appl. No. 11/057,392.
Notice of Allowance mailed Aug. 10, 2006 in U.S. Appl. No. 11/057,392.
Request for Continued Examination mailed Nov. 13, 2006 in U.S. Appl. No. 11/057,392.
Notice of Allowance mailed Jun. 6, 2007 in U.S. Appl. No. 11/057,392.
Request for Continued Examination mailed Sep. 5, 2007 in U.S. Appl. No. 11/057,392.
Notice of Allowance mailed Sep. 25, 2007 in U.S. Appl. No. 11/057,392.
Request for Restriction/Election Requirement mailed Feb. 2, 2007 in U.S. Appl. No. 11/417,431.
Amendment and Response to Request for Restriction/Election Requirement mailed Feb. 2, 2007 in U.S. Appl. No. 11/417,431.
Office Action mailed Jun. 18, 2007 in U.S. Appl. No. 11/417,431.
Amendment and Response to Office Action mailed Jun. 18, 2007 in U.S. Appl. No. 11/417,431.
Communication from the EPO mailed Jan. 19, 2006 in European App. No. 05255703.0.
Official Communication in European Application No. 05255703.0 mailed Oct. 17, 2007.
Amendment and Response to Office Action mailed Aug. 1, 2007 in U.S. Appl. No. 10/794,825.
Extended European Search Report in European Application No. 05255715.4 mailed Feb. 25, 2008.
European Search Report in European Application No. 0525638.8 mailed May 4, 2006.
ISR and WO in International Application No. PCT/US2005/030441, filed Aug. 26, 2005.
ISR and WO in International Application No. PCT/US2005/030418.
Austrian Search Report for U.S. Appl. No. 11/057,392 dated May 12, 2005.
Request for Continued Examination (RCE), Amendment, and Information Disclosure Statement (IDS) in U.S. Appl. No. 10/794,825 dated Jun. 23, 2009.
Notice of Allowance in U.S. Appl. No. 10/794,825 dated Mar. 24, 2009.
Request for Continued Examination (RCE) and Information Disclosure Statement (IDS) in U.S. Appl. No. 10/794,825 dated Feb. 2, 2009.
Notice of Allowance in U.S. Appl. No. 10/794,825 dated Nov. 3, 2008.
Request for Continued Examination (RCE), Amendment, and Information Disclosure Statement (IDS) in U.S. Appl. No. 10/794,825 dated Aug. 15, 2008.
Office Action in U.S. Appl. No. 10/794,825 dated May 15, 2008.
Notice of Allowance in U.S. Appl. No. 11/417,431 dated Oct. 23, 2007.
Office Action in Chinese Application No. 2005101028024 dated May 9, 2008.
Office Action in Chinese Application No. 2005101028024 dated Mar. 13, 2009.
Office Action in Japanese Application No. 2005-218736 dated Jul. 14, 2008.
Office Action in Mexican Application No. PA/a/2005/010233 dated Oct. 30, 2007.
Office Action in Mexican Application No. PA/a/2005/010233 dated Jul. 7, 2008.
Office Action in European Application No. 05 724 222.4 dated Jul. 8, 2008.
Office Action in Japanese Application No. 2007-501906 dated Jul. 21, 2009.
Office Action in Mexican Application No. PA/a/2006/010063 dated Jan. 20, 2009.
Office Action in Mexican Application No. PA/a/2006/010063 dated Jul. 30, 2009.
Office Action in Russian Application No. 2006135114/28(038223) date stamped Mar. 31, 2009.
Office Action in Taiwanese Application No. 094106671 dated Oct. 30, 2006.
Office Action in Vietnamese Application No. 1-2006-01629 dated Apr. 29, 2009.
Decision of Rejection of Chinese Application No. 2005-101028024, dated Sep. 4, 2009.
Official Communication in European Application No. 05255703.0, Mar. 9, 2010.
Application as filed in U.S. Appl. No. 12/815,136 filed on Jun. 14, 2010.
International Search Report and Written Opinion in PCT/US2007/022736 (International Publication No. WO 2008/069877) dated Aug. 14, 2008.
International Preliminary Report on Patentability in PCT/US2007/022736 dated Feb. 5, 2009.
Notice of Allowance in U.S. Appl. No. 10/794,825 mailed on Sep. 30, 2009.
Office Action in Taiwanese App. No. 094106671 dated Apr. 26, 2010.
Office Action in European App. No. 05724222.4 dated Sep. 28, 2009.
Notice of Allowance in U.S. Appl. No. 12/036,668 mailed on Sep. 23, 2009.
RCE and IDS in U.S. Appl. No. 12/036,668 dated Nov. 13, 2009.
Notice of Allowance in U.S. Appl. No. 12/036,668 mailed on Nov. 19, 2009.
RCE and IDS in U.S. Appl. No. 12/036,668 dated Feb. 18, 2010.
Preliminary Amendment in U.S. Appl. No. 12/036,668 dated Feb. 25, 2010.
Notice of Allowance in U.S. Appl. No. 12/036,668 mailed on Apr. 8, 2010.
RCE/ Amendment/ IDS in U.S. Appl. No. 12/036,668 dated Jul. 7, 2010.
Notice of Allowance in U.S. Appl. No. 12/036,668 mailed on Jul. 21, 2010.
Office Action in U.S. Appl. No. 11/588,947 dated Nov. 24, 2008.
Amendment in U.S. Appl. No. 11/588,947 dated Mar. 24, 2009.
Final Office Action in U.S. Appl. No. 11/588,947 dated Jun. 11, 2009.
RCE and Amendment in U.S. Appl. No. 11/588,947 dated Sep. 11, 2009.
Office Action in U.S. Appl. No. 11/588,947 dated Dec. 24, 2009.
Amendment in U.S. Appl. No. 11/588,947 dated Apr. 26, 2010.
Supplemental Amendment in U.S. Appl. No. 11/588,947 dated May 17, 2010.

\* cited by examiner

INTEGRATED MODULATOR ILLUMINATION

PRIORITY APPLICATION

This application is a continuation of U.S. application Ser. No. 10/794,825, entitled "Integrated Modulator Illumination," filed on Mar. 5, 2004, now U.S. Pat. No. 7,706,050 which is incorporated herein by reference in its entirety.

BACKGROUND

Spatial light modulators used for imaging applications come in many different forms. Transmissive liquid crystal device (LCD) modulators modulate light by controlling the twist and/or alignment of crystalline materials to block or pass light. Reflective spatial light modulators exploit various physical effects to control the amount of light reflected to the imaging surface. Examples of such reflective modulators include reflective LCDs, and digital micromirror devices (DMD™).

Another example of a spatial light modulator is an interferometric modulator that modulates light by interference, such as the iMoD™. The iMoD employs a cavity having at least one movable or deflectable wall. As the wall, typically comprised at least partly of metal, moves towards a front surface of the cavity, interference occurs that affects the color of light viewed at the front surface. The front surface is typically the surface where the image seen by the viewer appears, as the iMoD is a direct-view device.

Generally, the iMoD is a highly reflective, direct view, flat panel display. Because of its high reflectivity, the iMoD has little need for illumination in most lighting conditions. The typical consumer expects to be able to read electronic displays in situations where there is little ambient illumination. Some form of illumination is needed for the iMoD and other purely reflective spatial light modulators that typically use ambient illumination.

Backside illumination techniques used extensively with LCDs do not work for purely reflective spatial light modulators. A purely reflective spatial light modulator is one through which light cannot be transmitted from back to front in such a manner as to illuminate the modulator elements. It is possible to leave gaps between the elements of a purely reflective spatial light modulator to allow backside illumination to travel through and emerge at the front of the panel, but the light will not contain any image information, as the light does not actually illuminate the elements, passing them by on its path through the display panel.

In one approach, as discussed in U.S. patent application Ser. No. 10/224,029, filed Aug. 19, 2002, now U.S. Pat. No. 7,110,158, and shown in FIG. 1a, 'micro-lamps' 104 are manufactured into the surface of the glass 102 bonded to the glass substrate 106 of a purely reflective spatial light modulator array 108. Each micro-lamp has an inherent reflective layer 105 that assists in directing light 113 from the micro-lamp to the array 108. An antireflective (AR) coating 100 reduces the amount of incident light 109 reflected from the surface. The light incident upon the modulator array 108 travels along paths 110 through the interface 107 and eventually reaches the viewer 111. This approach is somewhat complex and requires an extra layer of glass 102, into which the arc lamps and their control circuitry must be manufactured.

In an alternative approach in the same US patent application, a light pipe is used that includes scattering centers. This approach is shown in FIG. 1b. The light source 116 is mounted on a light guide 118. The light 122 is coupled into the light guide using a collimator 120. Scatter pad, or scattering center, 124 is an area of the light guide that has been roughened with a wet or dry etch. The roughened areas are then coated with a thin film stack of an absorbing surface towards the viewer 128 and a reflective surface towards the surface 112 and ultimately the modulator array 114. Light trapped within the light guide comes in contact with the scatter pad 124 and the total internal reflection is violated, and some portion of the light 129 scatters in all directions, including towards the modulator array via a reflection off of the thin film stack 126.

In either of these approaches, there are some problems. The manufacturing process is made much more complicated with the addition of several parts. The addition of the glass 102 or the light guide 118 adds thickness to the modulator, which may create parallax issues and decrease the visual quality of the image.

BRIEF DESCRIPTION OF THE DRAWINGS

The invention may be best understood by reading the disclosure with reference to the drawings, wherein.

DETAILED DESCRIPTION OF THE EMBODIMENTS

Figure 1A:
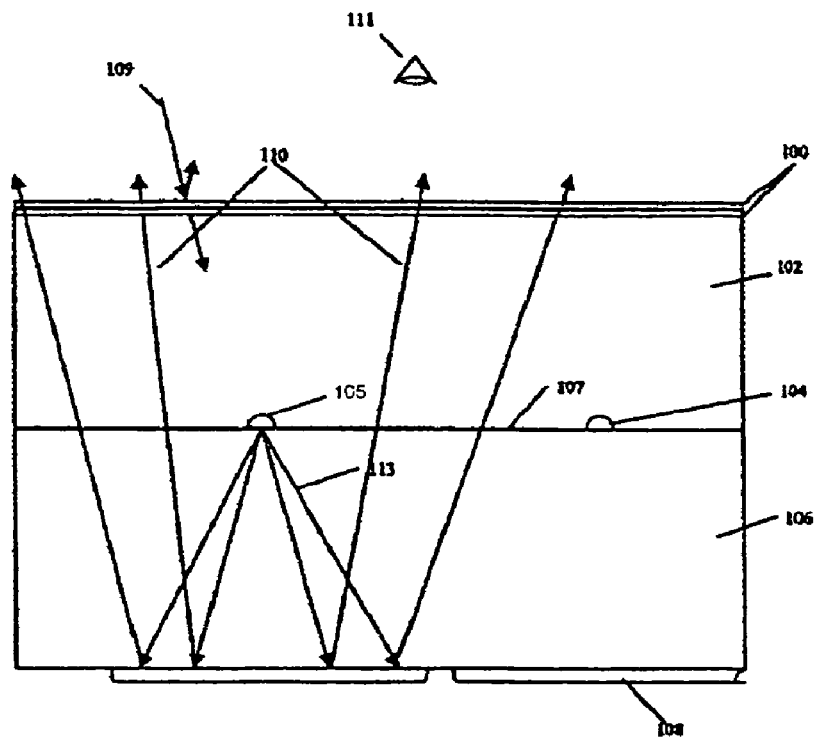
FIGS. 1a and 1b show prior art embodiments of methods to illuminate a purely reflective spatial light modulator.
Figure 1B:
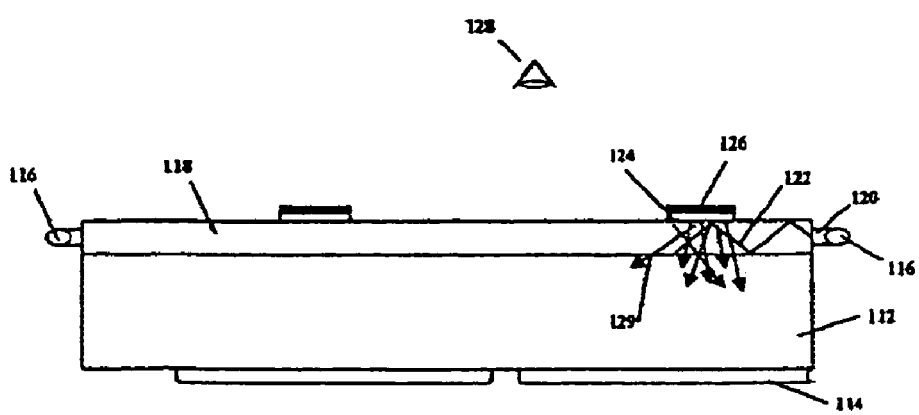
Figure 2:
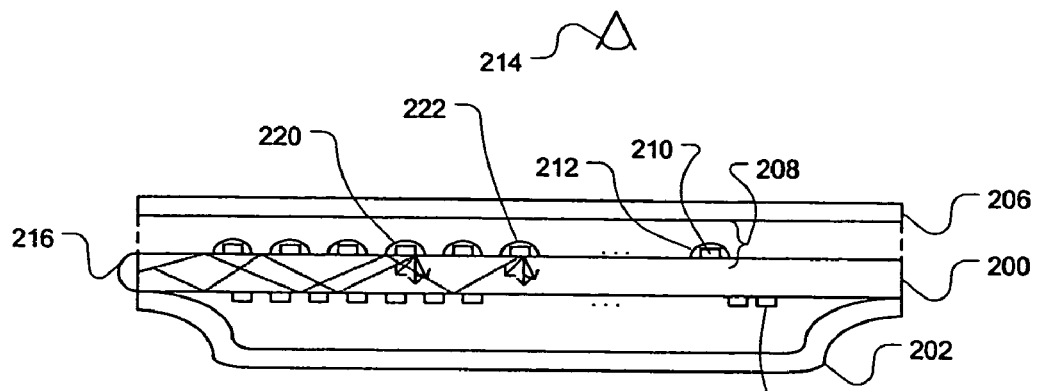
FIG. 2 shows an example of a spatial light modulator having illumination dots.

An embodiment of a purely reflective spatial light modulator having illumination dots is shown in FIG. 2. The spatial light modulator in this example is an interferometric modulator that modulates light by controlling the depth of a cavity between movable mirrors and optical films fabricated directly on the transparent substrate 200. Each element 204 of the array includes a miniature mirror suspended from the substrate. These mirrors can be individually activated to modulate the light that travels through the diffuser 206 and through the substrate 200 to reach the element 204. Each modulator element, when activated, can alter the color seen by a viewer 214 on the opposite side of the glass. Layer 202 acts as a back plate for the modulator and is generally opaque, rendering this type of modulator difficult to use with backlighting. The elements such as 204 are themselves opaque, which also makes backlighting difficult.

With application of a front lighting scheme, however, illumination dots 208 formed at the interface between the diffuser 206 and the substrate 200 can provide illumination for the display. Each dot 208 is comprised of a first layer 210 that is reflective towards the modulator array and a second layer 212 that is absorbing towards the viewer. This is similar to the scattering centers mentioned above, except that there is no need to add the extra step of wet or dry etching the substrate, as the illumination dots may be formed on the surface of the transparent substrate or the diffuser by various types of printing or thin film deposition techniques. While it is not necessary, the etching techniques may also be used on the transparent substrate if desired.

For purposes of discussion here, the display panel may be a combination of the substrate 200 and the diffuser 206, the substrate and an antireflective film, or just the substrate 200. The front panel has two surfaces. The first surface is that surface through which the viewer sees the modulated light. The second surface is that which is directly adjacent the modulator array. The first surface may have the diffuser on it, with the illumination dots considered to be on the first surface, regardless of whether they are formed on the substrate or the diffuser.

Interferometric modulators may use only ambient illumination. When used to create direct-view displays, they can utilize incoming light to form the images seen by the viewer. Illumination dots together with a light source associated with the display can supplement ambient light, increasing the brightness of the display. In total darkness, the illumination dots and the associated light source can provide all necessary illumination for the display. FIG. 2 also shows a light source 216, such as a cold cathode fluorescent tube or an edge emitting light pipe illuminated by a light emitting diode (LED), residing at one edge of the transparent substrate 200. Light emitted by the light source and properly injected into the transparent substrate would travel through the transparent substrate due to total internal reflection. It can be seen that light striking an illumination dot is reflected in several different directions as shown at dots 220 and 222.

The placement of the dots can be optimized depending upon the nature of the illumination and the environment in which the modulator may be used. For example, in FIG. 3a, the dot pattern is a very regular one. Dots in the dot pattern, such as dot 302, scatter light which subsequently strikes modulator elements such as elements 304a and 304b. The light scattered from dot 302 may have been internally reflected several times within transparent substrate 200 before striking dot 302 and being scattered.

Light injected into the transparent substrate will be internally reflected in the substrate. Without dots or some other perturbing surface structure this light will continue to traverse the substrate. With the use of illumination dots, the dot pattern can create uniform illumination. Various schemes can be applied to vary spacing in a regular way across the face of the transparent substrate to create uniform light emission, such as those shown in FIGS. 3b and 3c.

Figure 3A:
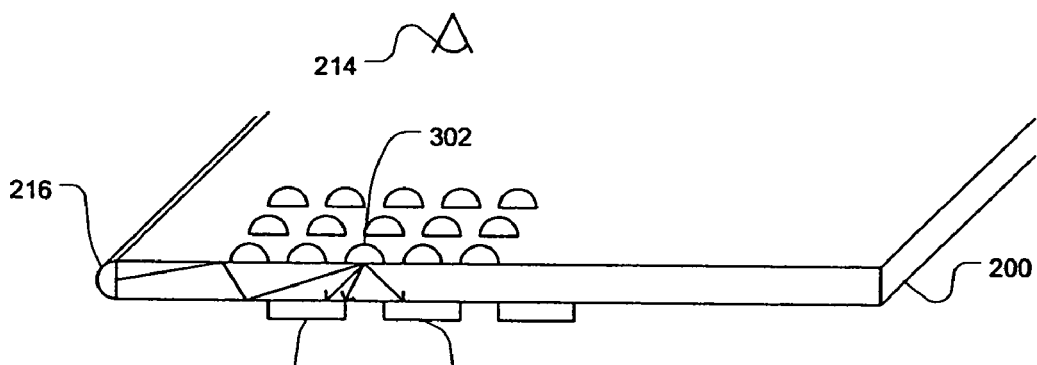
FIGS. 3a, 3b and 3c show different embodiments of illumination dot patterns used with an edge light.
Figure 3B:
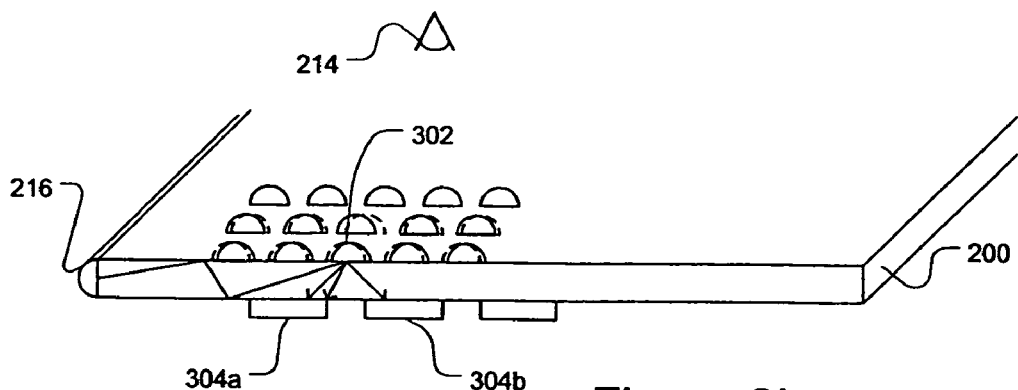
Figure 3C:
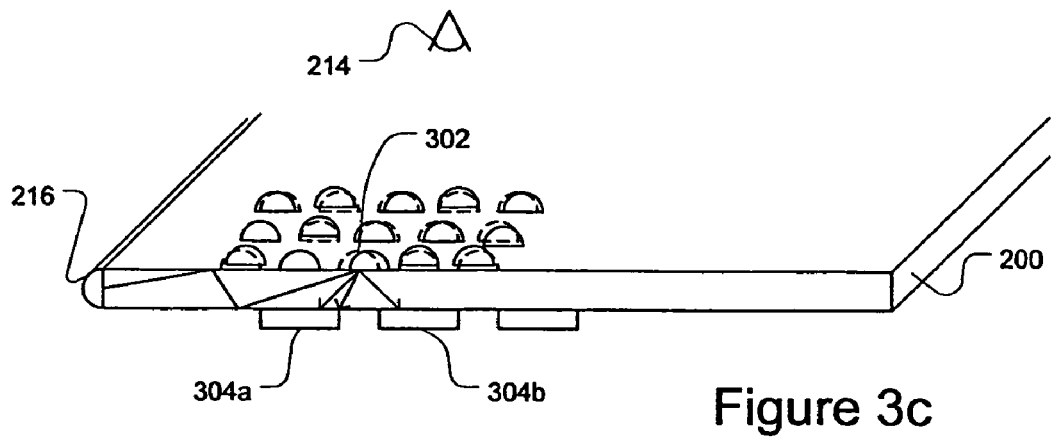

In FIG. 3b, the dot pattern is varied, but in a regular fashion, referred to here as a regular and varied pattern. The dot pattern of FIG. 3a is shown in dotted lines for comparison. As can be seen, each row, such as the one including element 302 is displaced from its previous position with a uniform variation. In the particular example of FIG. 3b, the first row varies 'forward' a particular distance from the previous position, and the second row varies a similar distance 'backwards.' This is just one example of a varied pattern with regular variation. FIG. 3c, in comparison not only employs variation but also includes spatial dithering as well, for a regular, varied and dithered pattern.

In general, the dots will be of a size too small to resolve by the vision of a human observer viewing the display at a normal viewing distance. Undesirable artifacts can sometimes still be created by arrays with features that are not individually resolvable. Careful design of the variation of the pattern, and/or the variation and dithering of the pattern and/or the fundamental spacing and arrangement of the pattern can be used to mitigate or eliminate any such undesirable artifacts.

The embodiments of FIGS. 3a-3c are directed to an edge lighting scheme, essentially a scheme in which the elements are 'front' lit. It is possible to also use a backlighting scheme. Use of back light with a purely reflective modulator on a transparent substrate may also suffer from some limitations.

Figure 4:
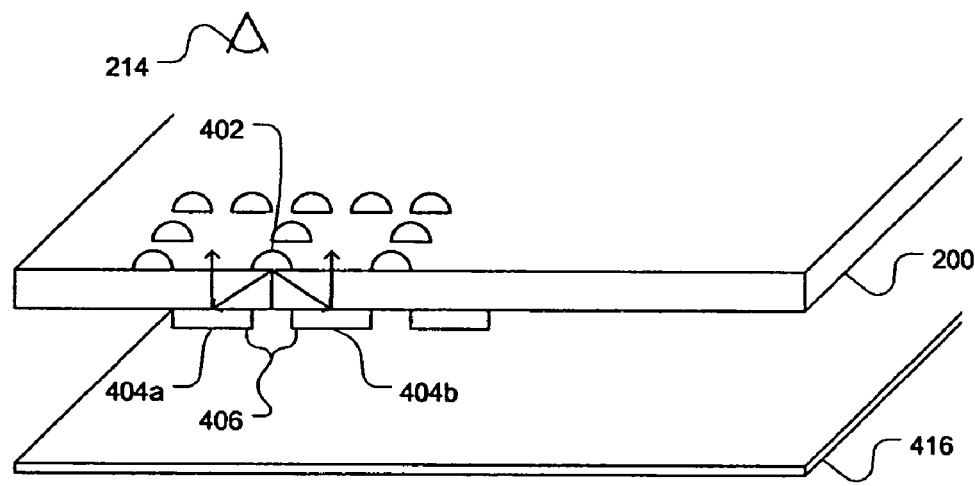
FIG. 4 shows an embodiment of an illumination dot pattern used with a back light.

The limitations in using a backlight with a purely reflective spatial light modulator array arise because the light travels from behind the modulating elements, such as elements 404a and 404b in FIG. 4, towards the viewer 216. The light can pass only through the very small gaps, such as 406, between the elements 404a and 404b. The modulator designer generally strives to keep these gaps as small a possible to maximize the reflectivity of the modulator. This limitation can be minimized by placing the dots on the top surface of the transparent substrate directly opposite the gaps between the elements. Typically, backlights such as 416 have uniform illumination characteristics and therefore uniform spacing would be appropriate. An example of such a pattern is shown in FIG. 4, where dots such as 402 are positioned to 'fill' the gaps. It is also possible to introduce variation into the placement of dots within the gaps.

Figure 5:
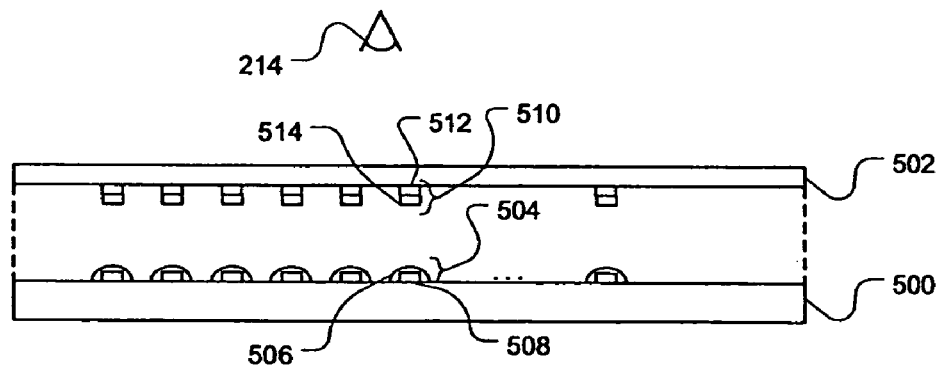
FIG. 5 shows embodiments of possible positions for illumination dots.

In addition to variation in the patterning of the dots, the surface upon which the dots are placed may also be varied. The dots will typically be placed so as to reside at the interface between the diffuser and the transparent substrate. Alternative surfaces for placement of the dots at this interface are shown in FIG. 5. The diffuser 502 is normally mated to the transparent substrate 500. For purposes of this figure, the diffuser has been lifted away from the substrate. The dots could be patterned onto the surface of the substrate 500, such as dot 504. Dot 504 has a reflective portion 508 towards the modulator array, not shown, and an absorbing portion 506 towards the viewer.

In an alternative, the dots could be placed on the surface of the diffuser 502, such as dot 510. Changing the position of the dots may modify the dot processing sequence. A dot on the surface such as 504 of the glass may have a first reflective material deposited and then covered by an 'overcoat' of absorbing material. If the dots reside on the surface of the diffuser such as 510, the absorbing material 512 would be put down first, then the reflective material 514. This maintains the proper orientation of the layers with regards to the modulator and the viewer 214.

Figure 6:
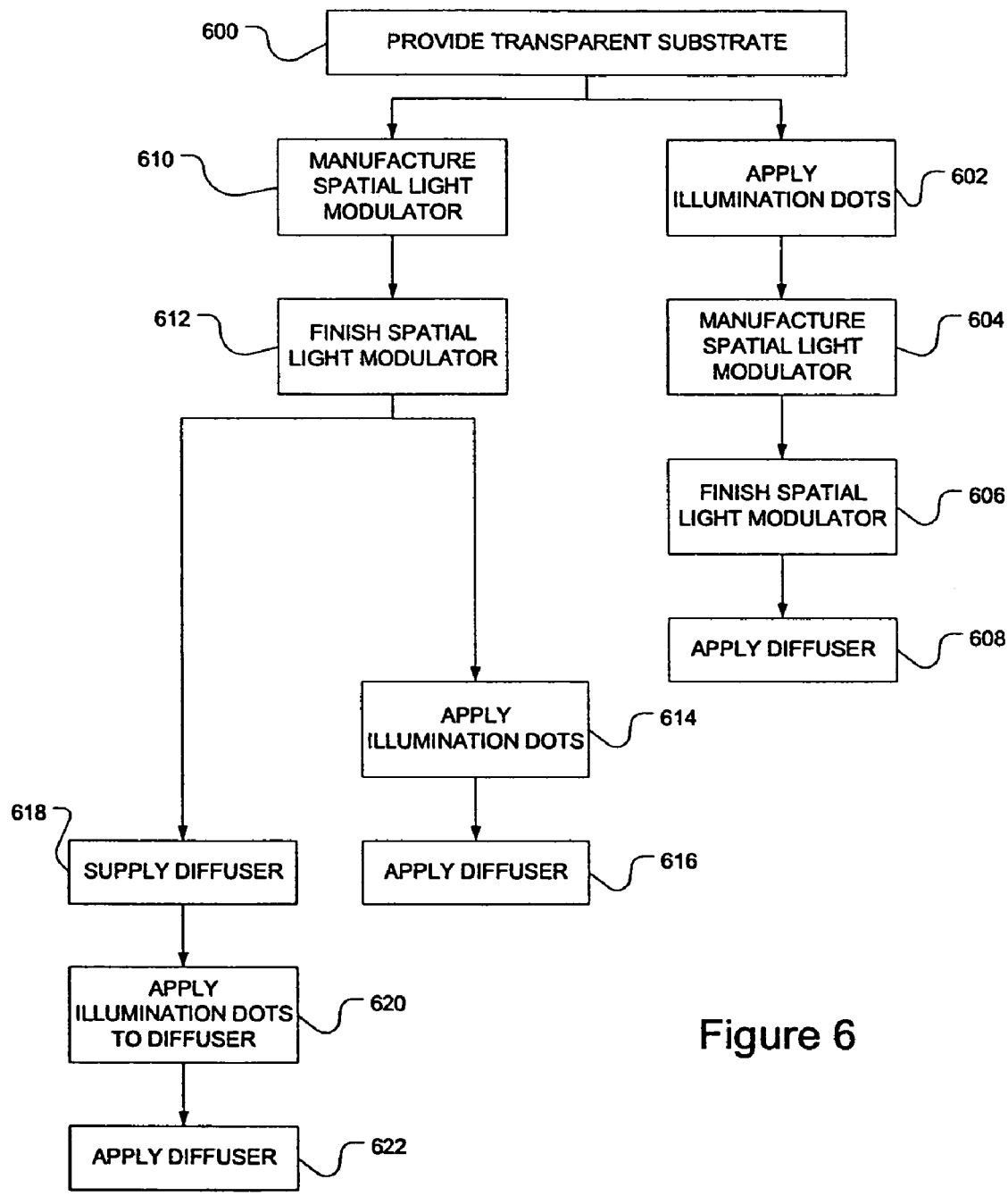
FIG. 6 shows a flow chart of a method to manufacture a spatial light modulator with illumination dots.

In addition to the flexibility in printing the dots on either the surface of the diffuser or the surface of the substrate and the flexibility as to what pattern and density the dots are printed, there is considerable flexibility as to the point in a manufacturing process the dots are formed. An embodiment of a method to manufacture a spatial light modulator array with illumination dots is shown in FIG. 6.

A first example of the process would start with providing a transparent substrate at 600. The illumination dots are 604. The modulator would be finished at 606, which may include such tasks as attaching applied to transparent substrate at 602. The spatial light modulator is then manufactured at a back plate. The diffuser is then applied to the substrate at 608, over the illumination dots. The combination of the diffuser and the transparent substrate may also be referred to as the display panel. The display panel may also comprise any other optical components, such as an antireflective film.

In an alternative embodiment, the spatial light modulator is manufactured on the 'back side' (away from the viewer) of the transparent substrate at 610. The spatial light modulator is then finished at 612. In one embodiment, the illumination dots are applied to the front side of the transparent substrate at 614 and then the diffuser is applied at 616.

In another alternative, a diffuser is supplied at 618 either after the modulator is finished at 612 or in parallel with the process of manufacturing and finishing the modulator. The illumination dots could then be applied to the diffuser at 620 and then the diffuser is applied to the transparent substrate at 622.

In any of the above embodiments, the process includes providing a transparent substrate with first and second surfaces, manufacturing the spatial light modulator on the second surface, applying the diffuser to the first surface and applying illumination dots. No order is implied by the listing the processes, as the order may change depending upon the embodiment.

For example, it may be desirable to put the dots on the substrate or the diffuser after manufacture of the modulator to allow for any printing mistakes to be made without affecting the yield of the modulator manufacture. If the dots are depositing during the manufacture process and something goes awry, it may negatively affect the yield of the process, as well as wasting an otherwise operable modulator. Putting the dots on the modulators that emerge from manufacturing may allow for more flexibility. Depending upon how the dots are formed, mistakes could be removed by cleaning the substrate with acetone or other solvents and techniques as appropriate, having no effect on the modulator elements sealed behind the substrate. Cleaning processes implemented during manufacture may damage the modulator.

The formation of the dots themselves may be done in one of many printing procedures, including lithographic printing, inkjet printing, screen-printing or any other type of printing technique. The dots could also be embossed onto the surface. Depending upon the type of technique used to deposit the dots, the shape of the dots may be controlled to maximize their effectiveness. As mentioned above, the dots would be printed at a resolution below the resolution of the human eye to avoid affecting the image quality as seen by the viewer.

Thus, although there has been described to this point a particular embodiment for a method and apparatus for illumination of purely reflective spatial light modulators, it is not intended that such specific references be considered as limitations upon the scope of this invention except in-so-far as set forth in the following claims.

What is claimed is:

1. A spatial light modulator comprising:
    a light-modulating array comprising a plurality of light-modulating elements each comprising an optical cavity defined by first and second reflective surfaces that produce optical interference, said optical cavity configured to enable modulation of said optical interference, said plurality of light-modulating elements having a front side for viewing light modulated by said light-modulating array; and
    at least one reflecting element, said at least one reflecting element comprising a first layer configured to reflect light propagating from a rear side of the plurality of light-modulating elements into at least one of said optical cavities for modulation,
    said at least one reflecting element further comprising a second layer configured to absorb light.

2. The spatial light modulator of claim 1, wherein said at least one reflecting element is disposed on the front side of said plurality of light-modulating elements.

3. The spatial light modulator of claim 1, wherein said at least one reflecting elements and said plurality of light-modulating elements are disposed on opposite sides of a substrate.

4. The spatial light modulator of claim 1, wherein said second reflective surface is movable with respect to the first reflective surface.

5. The spatial light modulator of claim 1, wherein the light modulating array comprises a plurality of gaps between the light modulating elements and wherein said at least one reflecting element is disposed over the gaps.

6. The spatial light modulator of claim 1, wherein the reflecting elements are uniformly spaced.

7. A method of manufacturing a spatial light modulator, the method comprising:
    providing a plurality of light-modulating elements so as to form a light-modulating array, each light modulating element comprising an optical cavity defined by first and second reflective surfaces, said second reflective surface movable with respect to the first reflective surface, said plurality of light-modulating elements having a front side for viewing light modulated by said light-modulating array, and
    printing or embossing at least one reflecting element so as to reflect light propagating from a rear side of the plurality of light-modulating elements into said optical cavity for modulation.

8. The method of claim 7, further comprising printing or embossing said at least one reflecting element on a substrate.

9. The method of claim 7, further comprising printing or embossing said at least one reflecting element on a layer of material on a substrate.

10. The method of claim 7, wherein said at least one reflecting element is printed or embossed on the front side of said plurality of light-modulating elements.

11. The method of claim 7, wherein said at least one reflecting element and said plurality of light-modulating elements are disposed on opposite sides of a substrate.

12. A spatial light modulator fabricated by the method of claim 7.

13. The method of claim 7, wherein the at least one reflecting element is printed.

14. The method of claim 13, wherein said at least one reflecting element is printed using lithographic printing.

15. The method of claim 13, wherein said at least one reflecting element is printed using inkjet printing.

16. The method of claim 13, wherein said at least one reflecting element is printed using screen printing.

17. The method of claim 7, wherein the at least one reflecting element is embossed.

18. A spatial light modulator comprising:
    means for modulating light, the light modulating means having a front side for allowing a viewer to view the modulated light, the light modulating means comprising means for creating an optical resonance, the resonance creating means comprising a first means for reflecting light and a second means for reflecting light that produce optical interference, the resonance creating means configured to enable modulation of the optical interference; and
    means for scattering light, said scattering means comprising a third means for reflecting configured to reflect light propagating from a rear side of the light modulating means into the resonance creating means,
    said scattering means further comprising a means for absorbing configured to absorb light.

19. The spatial light modulator of claim 18, wherein the light modulating means comprises a light modulating array including a plurality of light modulating elements.

20. The spatial light modulator of claim 18, wherein the resonance creating means comprises an optical cavity.

21. The spatial light modulator of claim 18, wherein the first light reflecting means comprises a first reflective surface.

22. The spatial light modulator of claim 18, wherein the second light reflecting means comprises a second reflective surface.

23. The spatial light modulator of claim 18, wherein the scattering means comprises reflecting elements, said third reflecting means comprises a reflecting layer and said absorbing means comprises an absorbing layer.

24. A spatial light modulator comprising:
   a light-modulating array comprising a plurality of light-modulating elements each comprising an optical cavity defined by first and second reflective surfaces that produce optical interference, said optical cavity configured to enable modulation of said optical interference;
   a transparent substrate having a first side and a second side, wherein light modulated by the plurality of light modulating elements is viewable by a viewer through said first side; and
   a plurality of illumination dots disposed on the first side of the substrate and configured to reflect light propagating from a rear side of the plurality of light-modulating elements into at least one of said optical cavities for modulation.

25. The spatial light modulator of claim 24, wherein the plurality of illumination dots is printed using a printing procedure selected from a group consisting of lithographic printing, inkjet printing and screen printing.

26. The spatial light modulator of claim 24, wherein the plurality of illumination dots is embossed.

27. The spatial light modulator of claim 24, wherein the illumination dots have a size below the resolution of a human eye.

28. The spatial light modulator of claim 24, further comprising a light source disposed rearward of the light-modulating array.

29. A spatial light modulator comprising:
   a light-modulating array comprising a plurality of light-modulating elements each comprising an optical cavity defined by first and second reflective surfaces that produce optical interference, said optical cavity configured to enable modulation of said optical interference;
   a transparent substrate having a first side and a second side, wherein light modulated by the plurality of light modulating elements is viewable by a viewer through said first side; and
   at least one reflecting element disposed on the first side of the substrate and configured to reflect light propagating from a rear side of the plurality of light-modulating elements into at least one of said optical cavities for modulation,
   wherein said at least one reflecting element has a size below the resolution of a human eye.

* * * * *

UNITED STATES PATENT AND TRADEMARK OFFICE
CERTIFICATE OF CORRECTION

PATENT NO.       : 7,880,954 B2  
APPLICATION NO.  : 11/417808  
DATED            : February 1, 2011  
INVENTOR(S)      : Sampsell It is certified that error appears in the above-identified patent and that said Letters Patent is hereby corrected as shown below:

On the Title Page at Item (56), Page 1, Col. 1, Line 4, under U.S. Patent Documents, change "at" to --et--.

On the Title Page at Item (56), Page 5, Col. 2, Line 30, delete "JP   2000 193933   11/2000".

On the Title Page at Item (56), Page 5, Col. 2, Line 32, delete "JP   2001 021883   1/2001".

On the Title Page at Item (56), Page 5, Col. 2, Line 36, delete "JP   2002 108227   4/2002".

On the Title Page at Item (56), Page 5, Col. 2, Line 41, delete "JP   2003131215   5/2003".

On the Title Page at Item (56), Page 5, Col. 1, Line 39, under U.S. Patent Documents, after "2010/0182308 A1   7/2010   Holman" insert

| | | |
|---|---|---|
| --5,151,801 | 9/1992  | Hiroshima |
| 5,341,242   | 8/1994  | Gilboa et al. |
| 5,731,857   | 3/1998  | Neijzen |
| 5,805,117   | 9/1998  | Mazurek |
| 5,991,073   | 11/1999 | Woodgate et al. |
| 6,483,613   | 11/2002 | Woodgate et al. |
| 6,636,322   | 10/2003 | Terashita |
| 6,642,913   | 11/2003 | Kimura |
| 6,657,700   | 12/2003 | Sako et al. |
| 6,841,787   | 1/2005  | Almogy |
| 6,967,779   | 11/2005 | Fadel et al. |
| 6,972,827   | 12/2005 | Mi, Xiang-Dong |
| 7,113,339   | 9/2005  | Taguchi et al. |
| 7,138,984   | 11/2006 | Miles |
| 7,142,347   | 11/2006 | Islam |

Signed and Sealed this  
Sixth Day of December, 2011

David J. Kappos  
*Director of the United States Patent and Trademark Office*

CERTIFICATE OF CORRECTION (continued)
U.S. Pat. No. 7,880,954 B2

7,161,730    1/2007    Floyd  
    7,218,429    5/2007    Batchko  
    7,342,705    3/2008    Chui et al.  
    7,342,709    3/2008    Lin  
    7,420,638    9/2008    Tasaka et al.  
    2002/0080465    6/2002    Han  
    2003/0161040    8/2003    Ishii  
    2003/0210363    11/2003    Yasukawa  
    2008/0112039    5/2008    Chui  
    2008/0151347    6/2008    Chui--.

On the Title Page at Item (56), Page 6, Col. 1, Line 15, under Foreign Patent Documents, after "WO WO 2008/069877   6/2008" insert --DE    19622748    12/1997  
    JP    57-3266    1/1982  
    JP    58 115781    8/1983  
    JP    09 171111    6/1997  
    JP    11-052887    2/1999  
    JP    11 316553    11/1999  
    JP    2000 514568    10/2000  
    JP    2001 305312    10/2001  
    JP    2002-014344    1/2002  
    JP    2002 174780    6/2002  
    JP    2003 007114    1/2003  
    JP    2004-070189    3/2004  
    JP    2004-126196    4/2004  
    JP    2004-206049    7/2004  
    WO    WO 97/46908    12/1997  
    WO    WO 98/52094    11/1998  
    WO    WO 01/81994    11/2001  
    WO    WO 2004/003643    1/2004  
    WO    WO 2004/012004    2/2004  
    WO    WO 2004/088372    10/2004  
    WO    WO 2005/011012    2/2005--.

On the Title Page at Item (56), Page 7, Col. 2, Line 65, under Other Publications, after "May 17, 2010" insert --Extended Search Report in European Application No. 10176513.9, dated October 22, 2010.  
    Office Action in Japanese Application No. 2007-501906, dated October 12, 2010.  
    Applicant Summary of Interview in U.S. Patent Application No. 11/057,392, dated December 21, 2007.

CERTIFICATE OF CORRECTION (continued)
U.S. Pat. No. 7,880,954 B2

Extended European Search Report in App. No. 101709764.4, dated October 7, 2010.
    Official Communication in Japanese Application No. 2005-218736, dated March 16, 2010.
    Office Action in Mexican Application No. PA/a/2005/010233, dated October 30, 2007.
    Office Action in Mexican Application No. PA/a/2005/010233, dated July 7, 2008.
    Request for Continued Examination and Information Disclosure Statement in U.S. App. No. 12/036,668, dated October 20, 2010.
    Preliminary Amendment in U.S. App. No. 12/036,668, dated October 25, 2010.
    Notice of Allowance in U.S. Patent Application No. 12/036,668, dated November 1, 2010.
    Notice of Allowance in U.S. App. No. 11/588,947, dated August 23, 2010.--.

On the Title Page at Item (56), Page 6, Col. 2, Line 5, under Other Publications, change "Rosonator" to --Resonator--.

On the Title Page at Item (57), Page 1, Col. 2, Line 6, under Abstract, replace "light" with --light.--.

At Column 4, Line 12, change "a" to --as--.

At Column 4, Lines 53-55, after "dots are" delete "604. The modulator would be finished at 606, which may include such tasks as attaching".

At Column 4, Line 56, after "at" insert --604. The modulator would be finished at 606, which may include such tasks as attaching--.